US012666468B2

(12) United States Patent
Yang et al.

(10) Patent No.: US 12,666,468 B2
(45) Date of Patent: Jun. 23, 2026

(54) SESSION VERIFICATION METHOD, USER EQUIPMENT, AND POLICY CONTROL FUNCTION ENTITY

(71) Applicant: GUANGDONG OPPO MOBILE TELECOMMUNICATIONS CORP., LTD., Dongguan (CN)

(72) Inventors: Haorui Yang, Dongguan (CN); Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 504 days.

(21) Appl. No.: 17/585,466

(22) Filed: Jan. 26, 2022

(65) Prior Publication Data

US 2022/0150991 A1     May 12, 2022

Related U.S. Application Data

(63) Continuation of application No. PCT/CN2019/099318, filed on Aug. 5, 2019.

(51) Int. Cl.
| | |
|---|---|
| *H04W 40/02* | (2009.01) |
| *H04W 76/10* | (2018.01) |
| *H04W 84/04* | (2009.01) |

(52) U.S. Cl.
CPC ........... *H04W 76/10* (2018.02); *H04W 40/02* (2013.01); *H04W 84/042* (2013.01)

(58) Field of Classification Search
CPC ... H04W 76/10; H04W 40/02; H04W 84/042; H04W 40/24; H04W 12/08; H04W 12/69; H04W 76/11; H04W 76/18; H04W 8/14
See application file for complete search history.

(56) References Cited

U.S. PATENT DOCUMENTS

| | | | | |
|---|---|---|---|---|
| 10,602,422 | B1 * | 3/2020 | Jagannatha | ............. H04L 41/40 |
| 10,841,084 | B2 * | 11/2020 | Lee | ........................ H04L 63/102 |
| 2018/0227302 | A1 * | 8/2018 | Lee | ........................ H04L 9/3273 |
| 2019/0007992 | A1 * | 1/2019 | Kim | ....................... H04W 76/27 |

(Continued)

FOREIGN PATENT DOCUMENTS

| | | |
|---|---|---|
| CN | 109548175 A | 3/2019 |
| CN | 109819485 A | 5/2019 |

(Continued)

OTHER PUBLICATIONS

OPPO: "Updating UE Route Selection Policy", 3GPP Draft;S2-180380 (S2-178438) Updating UE Route Selection Policy-DP, vol. SA WG2, No. Reno, Nevada, USA; Nov. 27, 2017-Dec. 1, 2017 Jan. 16, 2018 (Jan. 16, 2018)XP051389805, entire document.

(Continued)

*Primary Examiner* — Abdullahi E Salad
(74) *Attorney, Agent, or Firm* — Ladas & Parry, LLP

(57)     ABSTRACT

A session verification method includes that: UE receives a UE route selection policy (URSP) from a policy control function (PCF) entity, where the URSP includes a route selection descriptor (RSD) identifier (ID) or a URSP rule ID; and the UE sends a session parameter to a first network element, where the session parameter is used for verifying whether a PDU session establishment requested by the UE or the data transmitted through a PDU session is correct. A UE and a PCF are also provided.

16 Claims, 15 Drawing Sheets

UE receives a URSP sent by a PCF entity      S201

The UE sends a session parameter to a first network element      S202

(56)     References Cited

U.S. PATENT DOCUMENTS

| | | | | | |
|---|---|---|---|---|---|
| 2020/0221376 | A1* | 7/2020 | Li | .......................... | H04W 80/10 |
| 2020/0304983 | A1* | 9/2020 | Zhu | ....................... | H04W 36/00 |
| 2020/0305211 | A1* | 9/2020 | Foti | ...................... | H04W 12/08 |
| 2021/0120596 | A1* | 4/2021 | Youn | ..................... | H04W 76/12 |
| 2021/0219221 | A1* | 7/2021 | Li | .......................... | H04W 80/04 |
| 2022/0053416 | A1* | 2/2022 | Salkintzis | ............. | H04W 48/18 |
| 2022/0272620 | A1* | 8/2022 | Ninglekhu | ............ | H04W 40/02 |

FOREIGN PATENT DOCUMENTS

| | | |
|---|---|---|
| CN | 110049519 A | 7/2019 |
| WO | 2019114684 A1 | 6/2019 |

OTHER PUBLICATIONS

Supplementary European Search Report in the European application No. 19940601.8, mailed on Jul. 20, 2022.

English translation of the Written Opinion of the International Search Authority in the international application No. PCT/CN2019/099318, mailed on Apr. 22, 2020.

International Search Report in the international application No. PCT/CN2019/099318, mailed on Apr. 22, 2020, and its English Translation provided by WIPO.

Written Opinion in the international application No. PCT/CN2019/099318, mailed on Apr. 22, 2020, and its English Translation provided by Google Translate.

\* cited by examiner

100

A PCF entity sends a URSP to UE                                    S401

The PCF entity receives a session parameter                        S402

The PCF entity determines an RSD according to the session
parameter                                                          S403

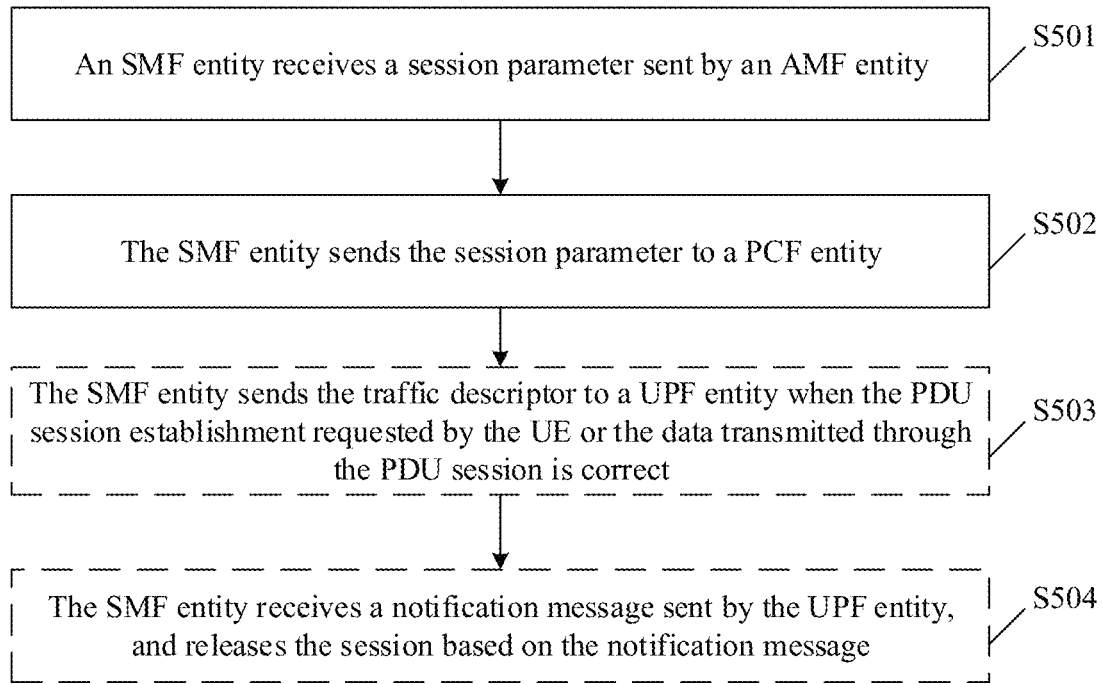

An SMF entity receives a session parameter sent by an AMF entity          S501

The SMF entity sends the session parameter to a PCF entity          S502

The SMF entity sends the traffic descriptor to a UPF entity when the PDU session establishment requested by the UE or the data transmitted through the PDU session is correct          S503

The SMF entity receives a notification message sent by the UPF entity, and releases the session based on the notification message          S504

FIG. 8

SESSION VERIFICATION METHOD, USER EQUIPMENT, AND POLICY CONTROL FUNCTION ENTITY

CROSS-REFERENCE TO RELATED APPLICATION

This application is a U.S. continuation application of International Application No. PCT/CN2019/099318, entitled "SESSION VERIFICATION METHOD, ELECTRONIC DEVICE, AND STORAGE MEDIUM", filed on Aug. 5, 2019, the disclosure of which is hereby incorporated by reference in its entirety.

TECHNICAL FIELD

The present disclosure relates to the technical field of wireless communications, and particularly to a method for session verification, a User Equipment (UE), and a Policy Control Function (PCF) entity.

BACKGROUND

In a related art, after a terminal device initiates a Protocol Data Unit (PDU) session establishment request to a network device, the network device cannot determine whether a session establishment requested by the terminal device or data transmitted through the session is correct.

SUMMARY

The aspects of the present disclosure provide a method for session verification, a User Equipment (UE), and a Policy Control Function (PCF) entity.

According to a first aspect, an embodiment of the present disclosure provides a method for session verification, which includes the following operations. User Equipment (UE) receives a UE Route Selection Policy (URSP) from a Policy Control Function (PCF) entity, the URSP including a Route Selection Descriptor (RSD) Identifier (ID) or a URSP rule ID. The UE sends a session parameter to a first network element, the session parameter being used for verifying whether a Protocol Data Unit (PDU) session establishment requested by the UE or data transmitted through a PDU session is correct.

According to a second aspect, an embodiment of the present disclosure provides a method for session verification, which includes that: a PCF entity sends a URSP to UE, the URSP including an RSD ID or a URSP rule ID.

According to a third aspect, an embodiment of the present disclosure provides a UE, which includes a processor.

The processor is configured to receive, through a network interface, a URSP from a PCF entity, the URSP including an RSD ID or a URSP rule ID; and send, through the network interface, a session parameter to a first network element, the session parameter being used for verifying whether a PDU session establishment requested by the UE or data transmitted through a PDU session is correct.

According to a fourth aspect, an embodiment of the present disclosure provides a PCF entity, which includes a processor.

The processor is configured to send, through a network interface, a URSP to a UE, the URSP including an RSD ID or a URSP rule ID.

BRIEF DESCRIPTION OF THE DRAWINGS

FIG. 8 is an optional processing flowchart of a session verification method applied to an SMF entity according to an embodiment of the present disclosure.

DETAILED DESCRIPTION

Figure 1:
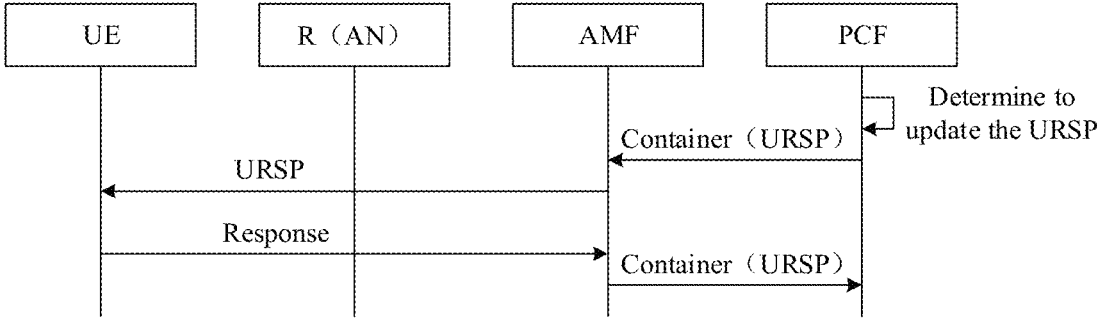
FIG. 1 is a processing flowchart of acquiring a URSP by UE through a UE Configuration Update (UCU) flow.

In order to make the characteristics and technical contents of the embodiments of the present disclosure understood in more detail, implementation of the embodiments of the present disclosure will be described below in combination with the drawings in detail. The appended drawings are only for description as references and not intended to limit the embodiments of the present disclosure.

Before a session verification method provided in the embodiments of the present disclosure is described in detail, a UE Route Selection Policy (URSP) in a related art is briefly described at first.

In a 5th-Generation (5G) network, a network device configures a URSP for UE to normalize features of PDU sessions requested to be established by the UE and specify the feature of a PDU session required to be used for data of a certain application.

An optional form of the URSP is shown in the following Table 1. The URSP consists of one or more URSP rules, and each URSP rule includes a traffic descriptor and at least one Route Selection Descriptor (RSD).

TABLE 1

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor component for the URSP rule. | Mandatory (NOTE 3) | | |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descripto are described in table 2. | Mandatory | | |

An optional form of the RSD is shown in the following Table 2. Each RSD corresponds to an attribute of a PDU session, namely service data corresponding to a traffic descriptor may be transmitted in a PDU session corresponding to the RSD. The RSD is used for determining a feature of a PDU session required to be used, e.g., Data Network Name (DNN) and Single Network Slice Selection Assistance Information (S-NSSAI).

TABLE 2

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |

TABLE 2-continued

| Information name | Description | Category | PCF permitted to modify in URSP | Scope |
|---|---|---|---|---|
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

The UE associates, based on a URSP, an application to a corresponding PDU session for transmission may include the following processing process. When an application layer has data or a connection establishment is requested, the UE checks whether a feature of the data or request is matched with a traffic descriptor of one of URSP rules using the URSP rules in the URSP. A checking order is determined according to precedences in traffic descriptors in the URSP rules. That is, the UE sequentially checks matching conditions of the feature of the data and the URSP based on an order of precedences of the traffic descriptors. When a URSP rule is matched, the PDU session is bound using an RSD list under the URSP rule.

When a URSP rule is matched, the UE searches for a proper PDU session in an order of precedences of RSDs, and preferentially uses an RSD with a high precedence. If a certain parameter in the RSD has one or more values, the UE selects and combines one value of the parameter and another parameter in the RSD to checks whether there is a PDU session. If there is a corresponding PDU session, data of the application is bound to the PDU session for transmission. If there is no corresponding PDU session, the UE triggers the establishment of the PDU session. The UE reports an attribute parameter of the PDU session in a request for triggering the establishment of the PDU session. If the PDU session is successfully established, the UE binds the data of the application to the PDU session for transmission. If the PDU session fails to be established, the UE modifies another parameter combination in the RSD or uses a parameter combination in an RSD with a second highest precedence, and then checks whether there is a PDU session. If no proper PDU session may be found for binding according to the matched URSP rule, the UE checks whether a traffic descriptor in the URSP rule with the second highest precedence may be matched with the data feature of the application in an order of precedences, and when the traffic descriptor in the URSP rule with the second highest precedence matches with the data feature of the application, the UE repeats the above-described flow of searching for a PDU session.

The UE acquires a URSP through a UE Configuration Update (UCU) flow. As illustrated in FIG. 1, a PCF entity puts, in a container, and sends a URSP to be updated to an AMF entity. The AMF entity transparently transmits the container to the UE through a Non-Access stratum (NAS) message. If the UE is in an idle state, the AMF entity needs to make the UE in a connected state and establishes a NAS connection with the UE before transparently transmitting the container to the UE. After receiving the URSP, the UE sends a response to the AMF entity through a container to indicate whether the URSP is transmitted successfully or unsuccessfully. The AMF entity transparently transmits a transmission result to the PCF entity through a container.

The present disclosure provides a session verification method. The session verification method of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced LTE (LTE-A) system, a New Radio (NR) system, an evolved system of the NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next-generation communication system, or another communication system.

Generally speaking, connections supported by a conventional communication system are usually limited in number and also easy to implement. However, with the development of communication technologies, a mobile communication system will not only support conventional communication but also support, for example, Device to Device (D2D) communication, Machine to Machine (M2M) communication, Machine Type Communication (MTC) and Vehicle to Vehicle (V2V) communication. The embodiments of the present disclosure may also be applied to these communication systems.

A system architecture and service scene described in the embodiments of the present disclosure are for describing the technical solutions of the embodiments of the present disclosure more clearly and not intended to limit the technical solutions provided in the embodiments of the present disclosure. Those of ordinary skill in the art should know that, with the evolution of the network architecture and the emergence of new service scenes, the technical solutions provided in the embodiments of the present disclosure are also suitable for similar technical problems.

A network device involved in the embodiments of the present disclosure may be an ordinary base station (for example, a NodeB (NB) or an Evolutional Node B (eNB or eNodeB) or a gNB), an NR controller, a centralized unit, an NR base station, a radio remote module, a micro NodeB, a relay, a distributed unit, a Transmission Reception Point (TRP), a Transmission Point (TP), or any other device. A specific technology and specific device form for the network device are not limited in the embodiments of the present disclosure. For the ease of description, in all the embodiments of the present disclosure, any device providing a wireless communication function for a terminal device is collectively referred to as a network device.

In the embodiments of the present disclosure, the terminal device may be any terminal. For example, the terminal device may be MTC UE. That is, the terminal device may also be called UE, a Mobile Station (MS), a mobile terminal, a terminal, etc. The terminal device may communicate with one or more core networks through a Radio Access Network (RAN). For example, the terminal device may be a mobile phone (or called a "cell" phone) and a computer with a mobile terminal. For example, the terminal device may also be a portable, pocket, handheld, computer-embedded or vehicle-mounted mobile device which performs voice and/or data exchange with the RAN. No specific limits are made in the embodiments of the present disclosure.

Optionally, the network device and the terminal device may be deployed on the land indoors or outdoors in a handheld or vehicle-mounted form, or may be deployed on the water, or may be deployed on an airplane, balloon and satellite in the air. An application scenario of the network device and the terminal device is not limited in the embodiments of the present disclosure.

Optionally, between a network device and a terminal device and between terminal devices, communication may be implemented through a licensed spectrum, or communication may be implemented through an unlicensed spectrum, or communication may be implemented through both the licensed spectrum and the unlicensed spectrum. Between a network device and a terminal device and between terminal devices, communication may be implemented through a spectrum below 7 Gigahertz (GHz), or communication may be implemented through a spectrum above 7 GHz, or communication may be implemented through both the spectrum below 7 GHz and the spectrum above 7 GHz. A spectrum resource used between the network device and the terminal device is not limited in the embodiments of the present disclosure.

Generally speaking, connections supported by a conventional communication system are usually limited in number and also easy to implement. However, with the development of communication technologies, a mobile communication system will not only support conventional communication but also support, for example, D2D communication, M2M communication, MTC communication, and V2V communication. The embodiments of the present disclosure may also be applied to these communication systems.

Figure 2:
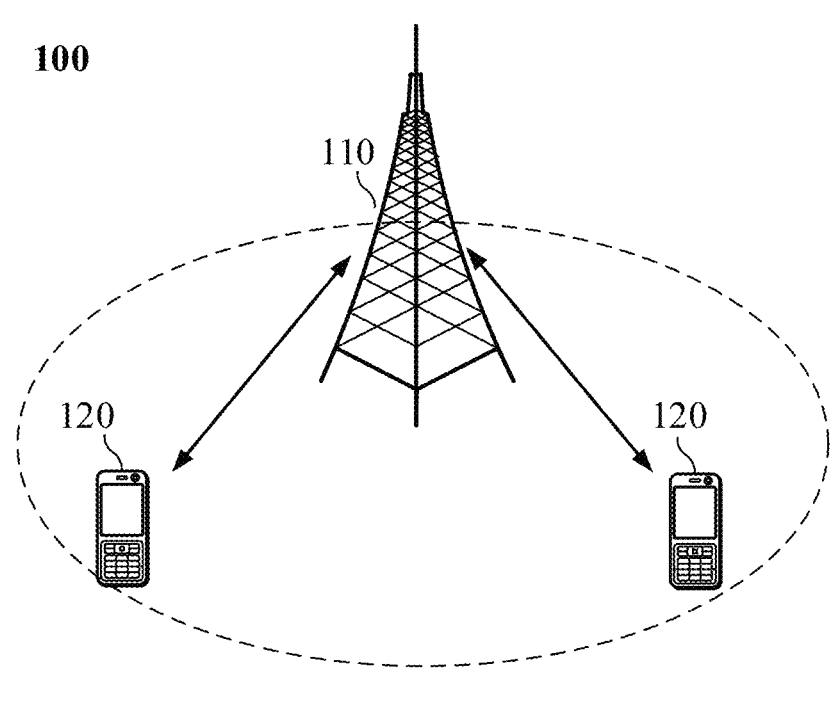
FIG. 2 is a composition structure diagram of a communication system according to an embodiment of the present disclosure.

Exemplarily, FIG. 2 shows a communication system 100 that the embodiments of the present disclosure are applied to. The communication system 100 may include a network device 110. The network device 110 may be a device communicating with a terminal device 120 (or called a communication terminal and a terminal). The network device 110 may provide a communication coverage for a specific geographical region and communicate with a terminal device in the coverage. Optionally, the network device 110 may be a Base Transceiver Station (BTS) in the GSM or the CDMA system, or may be an NB in the WCDMA system, or may be an eNB in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a future 5G network, a network device in a future evolved Public Land Mobile Network (PLMN), etc.

The communication system 100 further includes at least one terminal device 120 within the coverage of the network device 110. As used herein, "terminal device" includes, but not limited to, a device arranged to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device configured to communicate through a wireless interface may be called a "wireless communication terminal", a "wireless terminal", or a "mobile terminal." Examples of the mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent, or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in a 5G network, a terminal device in the future evolved PLMN, or the like.

Optionally, the terminal devices 120 may perform D2D communication with each other.

Optionally, the 5G system or the 5G network may also be called an NR system or an NR network.

FIG. 2 exemplarily shows one network device and two terminal devices. Optionally, the communication system 100 may include multiple network devices, and another number of terminal devices may be included in a coverage of each network device. No limits are made thereto in the embodiments of the present disclosure.

Optionally, the communication system 100 may further include another network entity such as a network controller and a mobility management entity. No limits are made thereto in the embodiments of the present disclosure.

It is to be understood that a device with a communication function in the network/system in the embodiments of the present disclosure may be called a communication device. For example, for the communication system 100 illustrated in FIG. 2, communication devices may include the network device 110 and terminal device 120 with the communication function, and the network device 110 and the terminal device 120 may be the specific devices as described above and will not be elaborated herein. The communication devices may further include other devices in the communication system 100, for example, other network entities like a network controller and a mobility management entity. No limits are made thereto in the embodiments of the present disclosure.

Figure 3:
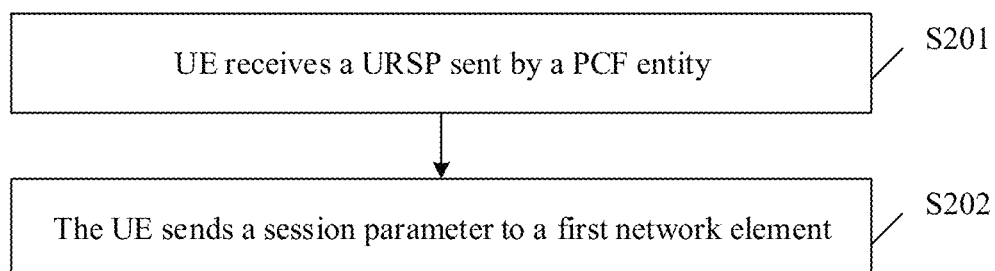
FIG. 3 is an optional processing flowchart of a session verification method applied to UE according to an embodiment of the present disclosure.

As illustrated in FIG. 3, an optional processing flow of a session verification method applied to UE in an embodiment of the present disclosure includes the following operations.

In S201, UE receives a URSP sent by a PCF entity, the URSP including an RSD ID or a URSP rule ID.

In some embodiments, each RSD has a respective RSD ID. Moreover, the RSD ID is unique in the UE. The RSD ID is allocated by a Home Policy Control Function (H-PCF) entity when the UE is in a Home Public Land Mobile Network (HPLMN). When the UE is in a Visited Public Land Mobile Network (VPLMN), an RSD ID in a URSP for an HPLMN is allocated by an H-PCF entity, and an RSD ID in a URSP for the VPLMN is allocated by a Visited Policy Control Function (V-PCF) entity. Alternatively, when the UE is in a VPLMN, both an RSD ID in a URSP for an HPLMN and an RSD ID in a URSP for the VPLMN are allocated by an H-PCF entity.

In some embodiments, the RSD ID may include a PLMN ID. Alternatively, the RSD ID may include no PLMN ID. The RSD IDs are numbered according to a sequence (order) of the RSD IDs in the URSP when the RSD ID includes a PLMN ID. When the RSD ID includes no PLMN ID, the RSD ID includes a serial number of the RSD ID in a PLMN in the URSP, and/or the RSD ID includes a serial number of the RSD ID in a URSP rule.

For example, when UE of operator A in China roams to a network of operator B in another country, an RSD ID of an HPLMN includes an ID of operator A in China, and an RSD ID of a VPLMN includes an ID of operator B.

Figure 4:
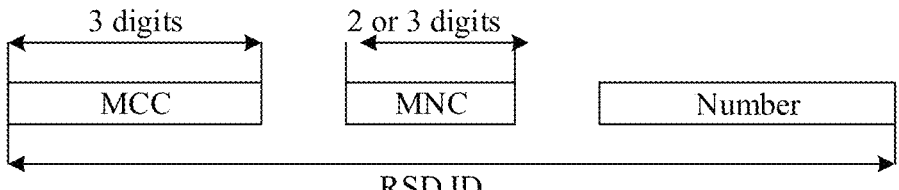
FIG. 4 is an optional schematic format diagram of an RSD ID according to an embodiment of the present disclosure.
Figure 5:
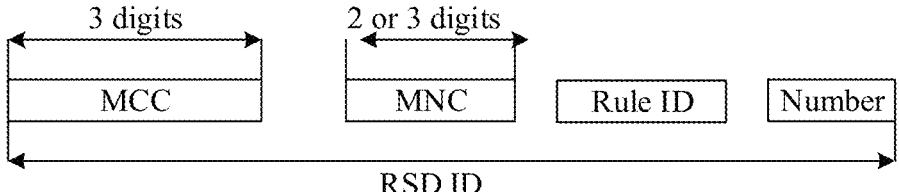
FIG. 5 is another optional schematic format diagram of an RSD ID according to an embodiment of the present disclosure.

FIG. 4 is an optional schematic format diagram of the RSD ID. The RSD ID includes a Mobile Country Code (MCC), a Mobile Network Code (MNC) and a serial number of the RSD ID in the URSP. FIG. 5 is another optional schematic format diagram of the RSD ID. The RSD ID includes an MCC, an MNC, a serial number of the RSD ID in the URSP rule, and a serial number of the RSD ID in a PLMN in the URSP. In the format of the RSD ID as illustrated in FIG. 5, the MCC, the MNC, and the serial number of the RSD ID in the URSP rule may be at the beginning of the URSP rule, and the serial number of the RSD ID in the PLMN in the URSP may be at the beginning of an RSD. That is, an RSD ID is divided into two parts for storage in a URSP rule.

In S202, the UE sends a session parameter to a first network element.

In some embodiments, the session parameter is used for verifying whether a PDU session establishment requested by the UE or data transmitted through a PDU session is correct. The first network element may be an AMF entity or an SMF entity.

In some embodiments, after matching (detecting) a proper URSP rule using a traffic descriptor, the UE initiates a session establishment flow and sends a NAS message to an AMF entity. In this scenario, the first network element is an AMF entity. The operation that the UE sends a session parameter to a first network element may include that the UE sends a NAS message to the AMF entity, the NAS message including a session establishment request or a session modification request. The session parameter at least includes at least one of the RSD ID or a traffic descriptor. Alternatively, the session parameter at least includes at least one of the URSP rule ID or the traffic descriptor. Correspondingly, the session parameter is carried (contained) in the session establishment request or the session modification request. Alternatively, the session parameter is carried (contained) in the NAS message but not in the session establishment request or the session modification request. Alternatively, the session parameter is carried (contained) in both the NAS message and one of the session establishment request or the session modification request. The first network element is an SMF entity when the RSD ID and/or traffic descriptor in the session parameter, or the URSP rule ID and/or traffic descriptor in the session parameter is carried (contained) in the session establishment request or the session modification request. The first network element is an AMF entity when the RSD ID and/or traffic descriptor in the session parameter, or the URSP rule ID and/or traffic descriptor in the session parameter is contained in the NAS message but not in the session establishment request or the session modification request.

In some embodiments, besides at least one of the RSD ID or the traffic descriptor, or at least one of the URSP rule ID or the traffic descriptor, the session parameter further includes at least one of the following: a PDU session ID, a UE ID, a DNN, S-NSSAI, or a request type of initial request. The DNN and the S-NSSAI are from the RSD in the URSP rule. A content of the NAS message sent by the UE may be illustrated in the following Table 3. A PDU session establishment request is stored in a payload container. The NAS message includes the RSD ID and the traffic descriptor.

TABLE 3

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | UL NAS TRANSPORT message identity | Message type 9.7 | M | V | 1 |
| | Payload container type | Payload container type 9.11.3.40 | M | V | 1/2 |
| | Spare half octet | Spare half octet 9.5 | M | V | 1/2 |
| | Payload container | Payload container 9.11.3.39 | M | LV-E | 3-65537 |
| 12 | PDU session ID | PDU session identity 2 9.11.3.41 | C | TV | 2 |
| 59 | Old PDU session ID | PDU session identity 2 9.11.3.41 | O | TV | 2 |
| 8 | Request type | Request type 9.11.3.47 | O | TV | 1 |
| 22 | S-NSSAI | S-NSSAI 9.11.2.8 | O | TLV | 3-10 |
| 25 | DNN | DNN 9.11.2.1A | O | TLV | 3-102 |
| 24 | Additional information | Additional information 9.11.2.1 | O | TLV | 3-n |
| Z | MA PDU session information | MA PDU session information | O | TV | 1 |
| X | RSD ID | X | O | X | X |
| X | Traffic Descriptor | X | O | X | X |

Figure 6:
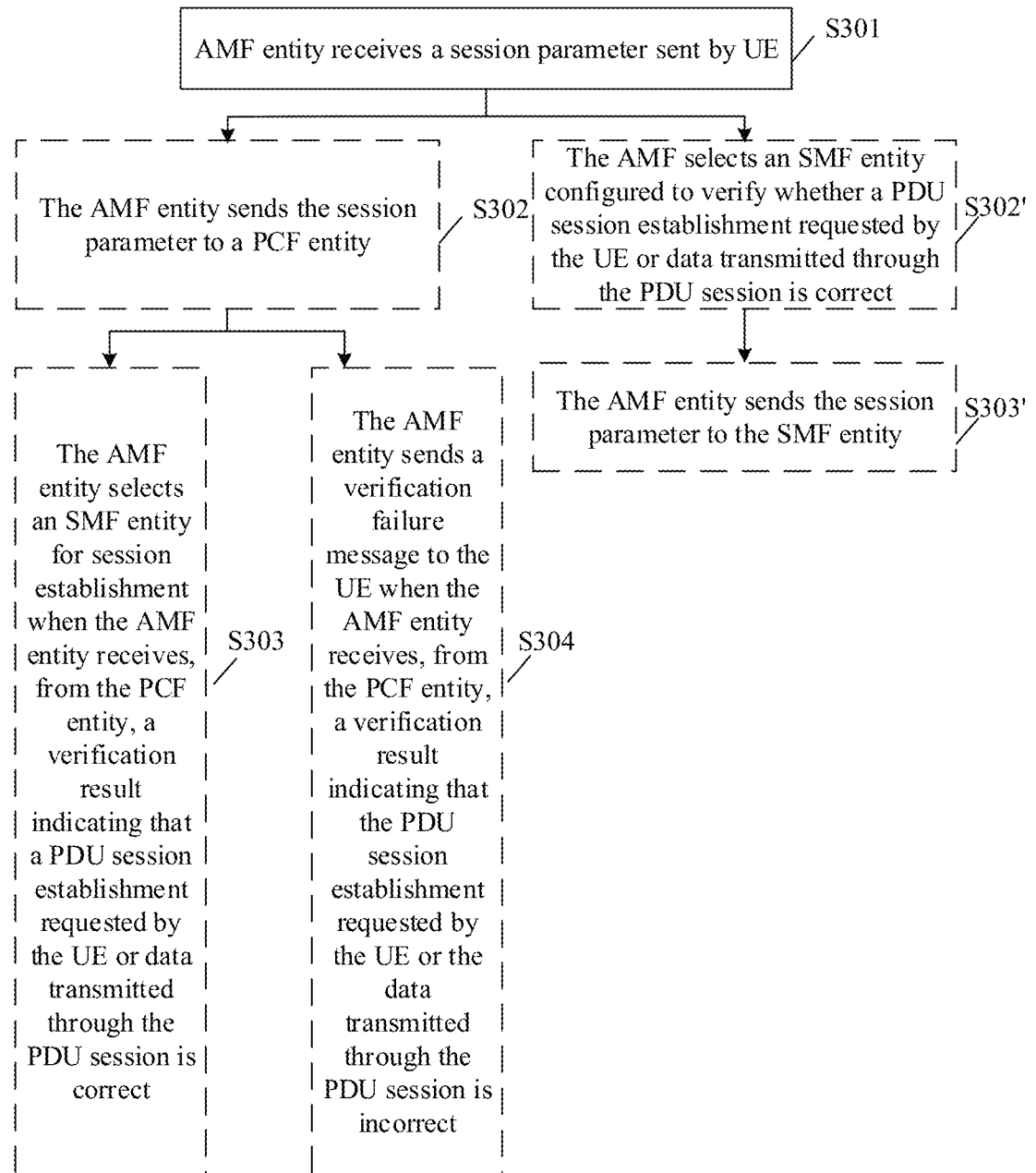
FIG. 6 is an optional processing flowchart of a session verification method applied to an AMF entity according to an embodiment of the present disclosure.

As illustrated in FIG. 6, an optional processing flow of a session verification method applied to an AMF entity in an embodiment of the present disclosure includes the following operations.

In S301, an AMF entity receives a session parameter sent by UE.

In some embodiments, the session parameter at least includes at least one of an RSD ID or a traffic descriptor. Alternatively, the session parameter at least includes at least one of a URSP rule ID or the traffic descriptor.

In some embodiments, the AMF entity receives a NAS message sent by the UE, the NAS message including a session establishment request or a session modification request. The session parameter at least includes at least one of the RSD ID or the traffic descriptor. Alternatively, the session parameter at least includes at least one of the URSP rule ID or the traffic descriptor. Correspondingly, the session parameter is contained in the session establishment request or the session modification request. Alternatively, the session parameter is contained in the NAS message but not in the session establishment request or the session modification request. Alternatively, the session parameter is contained in both the NAS message and the session establishment request or the session modification request.

In some embodiments, besides at least one of the RSD ID or the traffic descriptor, or at least one of the URSP rule ID or the traffic descriptor, the session parameter further includes at least one of the following: a PDU session ID, a UE ID, a DNN, S-NSSAI, or a request type of initial request.

In some embodiments, each RSD has a respective RSD ID. Moreover, the RSD ID is unique in the UE. The RSD ID is allocated by an H-PCF entity when the UE is in an HPLMN. When the UE is in a VPLMN, an RSD ID in a URSP for an HPLMN is allocated by an H-PCF entity, and an RSD ID in a URSP for the VPLMN is allocated by a V-PCF entity. Alternatively, when the UE is in a VPLMN, both an RSD ID in a URSP for an HPLMN and an RSD ID in a URSP for the VPLMN are allocated by an H-PCF entity.

In some embodiments, the RSD ID may include a PLMN ID. Alternatively, the RSD ID may include no PLMN ID. The RSD IDs are numbered according to a sequence of the RSD IDs in the URSP when the RSD ID includes a PLMN ID. When the RSD ID includes no PLMN ID, the RSD ID includes a serial number of the RSD ID in a PLMN in the URSP, and/or the RSD ID includes a serial number of the RSD ID in a URSP rule. A format of the RSD ID may be illustrated in FIG. 4 or FIG. 5.

In a first embodiment, the method further includes the following operations after S301.

In S302, the AMF entity sends the session parameter to a PCF entity.

In some embodiments, the session parameter is used for the PCF entity to verify whether a PDU session establishment requested by the UE or data transmitted through a PDU session is correct.

In some embodiments, the AMF entity sends the session parameter to an H-PCF entity when the UE is in an HPLMN. When the UE is in a VPLMN, the PCF entity is a V-PCF entity.

In S303, the AMF entity selects an SMF entity for session establishment when the AMF entity receives, from the PCF entity, a verification result indicating that the PDU session establishment requested by the UE or the data transmitted through the PDU session is correct.

In S304, the AMF entity sends a verification failure message to the UE when the AMF entity receives, from the PCF entity, a verification result indicating that the PDU session establishment requested by the UE or the data transmitted through the PDU session is incorrect, the verification failure message containing a failure cause value.

The cause value may be that verification fails, the parameter is not identified, routing may not be performed, etc.

In a second embodiment, the method further includes the following operations after S301.

In S302', the AMF selects an SMF entity configured to verify whether a PDU session establishment requested by the UE or data transmitted through the PDU session is correct.

In some embodiments, the AMF entity selects the SMF entity according to the DNN and/or the S-NSSAI.

In S303', the AMF entity sends the session parameter to the SMF entity.

In some embodiments, the AMF entity sends at least one of a PCF ID, a UE ID, the RSD ID, the traffic descriptor, the DNN, or the S-NSSAI to the SMF entity selected in S302'. The SMF entity sends the session parameter to a PCF entity to verify whether the PDU session establishment requested by the UE or the data transmitted through the PDU session is correct. The SMF entity sends the session parameter to an H-PCF entity in a non-roaming scenario. The SMF entity sends the session parameter to a V-PCF entity in a roaming scenario.

It is to be noted that S301, S302, S303 and S304 may be implemented independently as an independent embodiment, and S301, S302' and S303' may be implemented independently as an independent embodiment.

Figure 7:
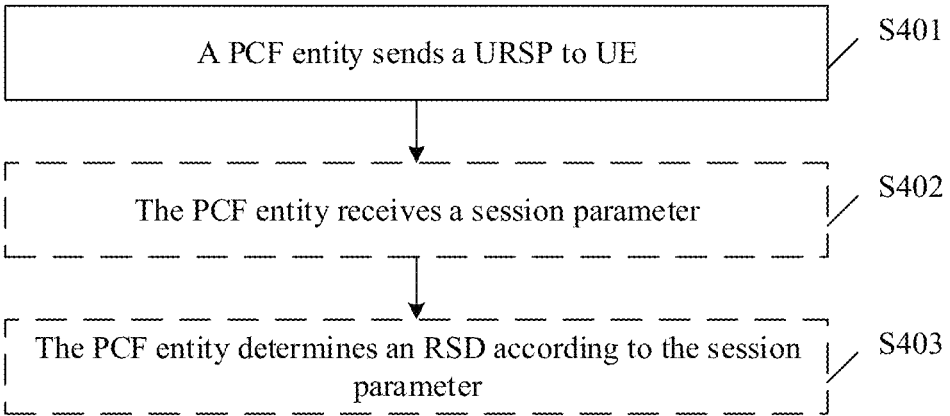
FIG. 7 is an optional processing flowchart of a session verification method applied to a PCF entity according to an embodiment of the present disclosure.

As illustrated in FIG. 7, an optional processing flow of a session verification method applied to a PCF entity in an embodiment of the present disclosure includes the following operations.

In S401, a PCF entity sends a URSP to UE.

In some embodiments, the URSP includes an RSD ID or a URSP rule ID. Each RSD has a respective RSD ID. Moreover, the RSD ID is unique in the UE. The RSD ID is allocated by an H-PCF entity when the UE is in an HPLMN. When the UE is in a VPLMN, an RSD ID in a URSP for an HPLMN is allocated by an H-PCF entity, and an RSD ID in a URSP for the VPLMN is allocated by a V-PCF entity. Alternatively, when the UE is in a VPLMN, both an RSD ID in a URSP for an HPLMN and an RSD ID in a URSP for the VPLMN are allocated by an H-PCF entity.

In some embodiments, the RSD ID may include a PLMN ID. Alternatively, the RSD ID may include no PLMN ID. The RSD IDs are numbered according to a sequence of the RSD IDs in the URSP when the RSD ID includes a PLMN ID. When the RSD ID includes no PLMN ID, the RSD ID includes a serial number of the RSD ID in a PLMN in the URSP, and/or the RSD ID includes a serial number of the RSD ID in a URSP rule. A format of the RSD ID may be illustrated in FIG. 4 or FIG. 5.

In some embodiments, the method may further include the following operation.

In S402, the PCF entity receives a session parameter.

In some embodiments, the session parameter at least includes at least one of the RSD ID or a traffic descriptor, or at least one of the URSP rule ID or the traffic descriptor. The session parameter may be sent by an AMF entity, or may be sent by an SMF entity.

In some embodiments, the method may further include the following operation.

In S403, the PCF entity determines an RSD according to the session parameter.

In some embodiments, the PCF entity determines the RSD according to the received session parameter. For example, an RSD corresponding to the RSD ID is determined according to the RSD ID in the session parameter.

Alternatively, an RSD corresponding to a URSP rule is determined according to the URSP rule ID.

In some embodiments, the PCF entity further determines that a PDU session establishment requested by the UE or data transmitted through the PDU session is correct when a parameter other than the RSD ID in the session parameter is consistent with that in the RSD determined by the PCF entity. For example, a DNN and/or S-NSSAI in the session parameter are/is compared with parameters in the found RSD. It is determined that the DNN and/or the S-NSSAI are/is consistent with the parameters in the found RSD if being the same as or forming a subset of the parameters in the RSD determined by the PCF entity. It is determined that the DNN and/or the S-NSSAI are/is inconsistent with the parameters if being different from or not a subset of the parameters in the RSD determined by the PCF entity.

In some other embodiments, the PCF entity determines that a session establishment requested by the UE or data transmitted through the PDU session is incorrect when a parameter other than the RSD ID in the session parameter is inconsistent with that in the RSD.

It is to be noted that the PCF entity queries the URSP according to the RSD ID and/or traffic descriptor in the session parameter and searches the URSP for a URSP rule corresponding to the RSD ID and/or the traffic descriptor and an RSD in the URSP rule. Both a V-PCF entity and an H-PCF entity may determine whether the PDU session establishment requested by the UE or the data transmitted through the PDU session is correct. However, in some specific scenarios, if the V-PCF entity may not find the RSD in the URSP rule corresponding to the RSD ID and/or the traffic descriptor, the V-PCF entity sends the session parameter to the H-PCF entity, and the H-PCF entity searches for the RSD in the URSP rule corresponding to the RSD ID and/or the traffic descriptor to determine whether the PDU session establishment requested by the UE or the data transmitted through the PDU session is correct.

As illustrated in FIG. 8, an optional processing flow of a session verification method applied to an SMF entity in an embodiment of the present disclosure includes the following operations.

In S501, an SMF entity receives a session parameter sent by an AMF entity.

In some embodiments, the session parameter at least includes at least one of an RSD ID or a traffic descriptor, or at least one of a URSP rule ID or the traffic descriptor.

In some other embodiments, besides at least one of the RSD ID or the traffic descriptor or at least one of the URSP rule ID or the traffic descriptor, the session parameter further includes at least one of the following: a PDU session ID, a UE ID, a DNN, S-NSSAI, and a request type of initial request.

For the RSD ID, an RSD ID corresponds to an RSD. Moreover, the RSD ID is unique for UE. The RSD ID is allocated by an H-PCF entity when the UE is in an HPLMN. When the UE is in a VPLMN, an RSD ID in a URSP for an HPLMN is allocated by an H-PCF entity, and an RSD ID in a URSP for the VPLMN is allocated by a V-PCF entity. Alternatively, when the UE is in a VPLMN, both an RSD ID in a URSP for an HPLMN and an RSD ID in a URSP for the VPLMN are allocated by an H-PCF entity.

In some embodiments, the RSD ID may include a PLMN ID. Alternatively, the RSD ID may include no PLMN ID. The RSD IDs are numbered according to a sequence of the RSD IDs in the URSP when the RSD ID includes a PLMN ID. When the RSD ID includes no PLMN ID, the RSD ID includes a serial number of the RSD ID in a PLMN in the URSP, and/or the RSD ID includes a serial number of the RSD ID in a URSP rule. A format of the RSD ID may be illustrated in FIG. 4 or FIG. 5.

In S502, the SMF entity sends the session parameter to a PCF entity.

The session parameter is used for the PCF entity to verify whether a PDU session establishment requested by the UE or data transmitted through the PDU session is correct.

The SMF entity sends the session parameter to an H-PCF entity in a non-roaming scenario. The SMF entity sends the session parameter to a V-PCF entity in a roaming scenario.

In some embodiments, the method may further include the following operation.

In S503, the SMF entity sends the traffic descriptor to a UPF entity when the PDU session establishment requested by the UE or the data transmitted through the PDU session is correct, the traffic descriptor being used for the UPF entity to determine whether data is transmitted through a correct session.

When the data is not transmitted through the correct session, the method may further include the following operation.

In S504, the SMF entity receives a notification message sent by the UPF entity. The SMF entity releases the session based on the notification message.

Figure 9:
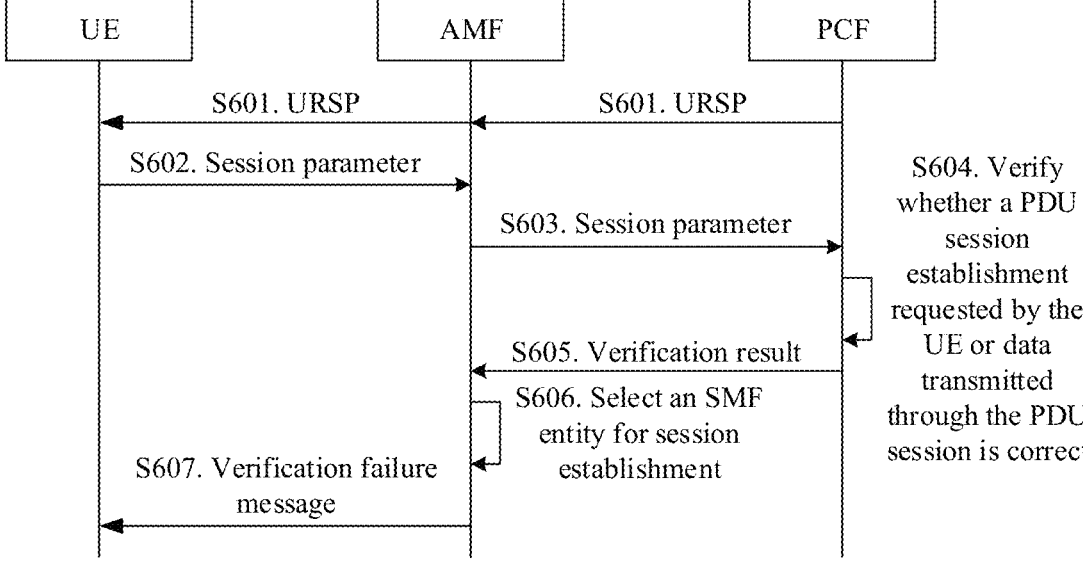
FIG. 9 is an optional processing flowchart of a session verification method applied to a communication system according to an embodiment of the present disclosure.

Based on the above descriptions about the respective session verification method applied to each network element, an optional processing flow of a session verification method applied to a communication system in an embodiment of the present disclosure includes the following operations, as illustrated in FIG. 9.

In S601, UE acquires a URSP from a PCF entity.

Here, descriptions about the URSP are the same as those about the URSP in S201. Elaborations are omitted herein.

In S602, the UE sends a session parameter to an AMF entity.

In some embodiments, the UE sends the session parameter to the AMF entity through a NAS message.

Here, descriptions about the session parameter are the same as those about the session parameter in S202. Elaborations are omitted herein.

In S603, the AMF entity sends the session parameter to the PCF entity.

In some embodiments, the AMF entity transparently transmits the session parameter to the PCF entity through a container.

In S604, the PCF entity verifies whether a PDU session establishment requested by the UE or data transmitted through the PDU session is correct based on the session parameter.

In some embodiments, the PCF entity determines that the PDU session establishment requested by the UE or the data transmitted through the PDU session is correct when a parameter other than an RSD ID in the session parameter is consistent with that in an RSD. For example, a DNN and/or S-NSSAI in the session parameter are/is compared with parameters in the found RSD. It is determined that the DNN and/or S-NSSAI are/is consistent with the parameters if being the same as or forming a subset of the parameters in the RSD.

In some other embodiments, the PCF entity determines that the PDU session establishment requested by the UE or the data transmitted through the PDU session is incorrect when a parameter other than an RSD ID in the session parameter is inconsistent with that in an RSD. For example, a DNN and/or S-NSSAI in the session parameter are/is compared with parameters in the found RSD. It is determined that the DNN and/or S-NSSAI are/is inconsistent with the parameters if being different from or not a subset of the parameters in the RSD.

In S605, the PCF entity sends a verification result to the AMF entity.

In S606, the AMF entity selects an SMF entity for session establishment in response to determining that the PDU session establishment requested by the UE or the data transmitted through the PDU session is correct.

The AMF entity sends the verified traffic descriptor or another parameter capable of characterizing data to the SMF entity. The another parameter capable of characterizing data may be an application ID, a server address of a service, etc. The traffic descriptor or the another parameter capable of characterizing data is forwarded to a UPF entity by the SMF entity. After data transmission is started, the UPF entity checks whether uplink data is consistent with the traffic descriptor or the another parameter capable of characterizing data according to the traffic descriptor or the another parameter capable of characterizing data, so as to determine whether the data is transmitted through a correct session. If incorrect data is found, the incorrect data is abandoned, and the SMF entity is notified to release the session.

In S607, the AMF entity sends a verification failure message to the UE in response to determining that the PDU session establishment requested by the UE or the data transmitted through the PDU session is incorrect, the verification failure message containing a failure cause value.

In some embodiments, the AMF entity returns a PDU session establishment request received from the UE to the UE with a cause value contained. The cause value may be a routing failure, an SMF entity selection failure, a URSP verification failure, etc.

A Mobility Management (MM) module in a NAS layer of the UE receives and forwards the cause value to a Session Management (SM) module. The SM module stops a timer started when the session is established. The flow may be restarted from S601.

It is to be noted that the RSD ID in the embodiment of the present disclosure may be replaced with a URSP rule ID.

Figure 10:
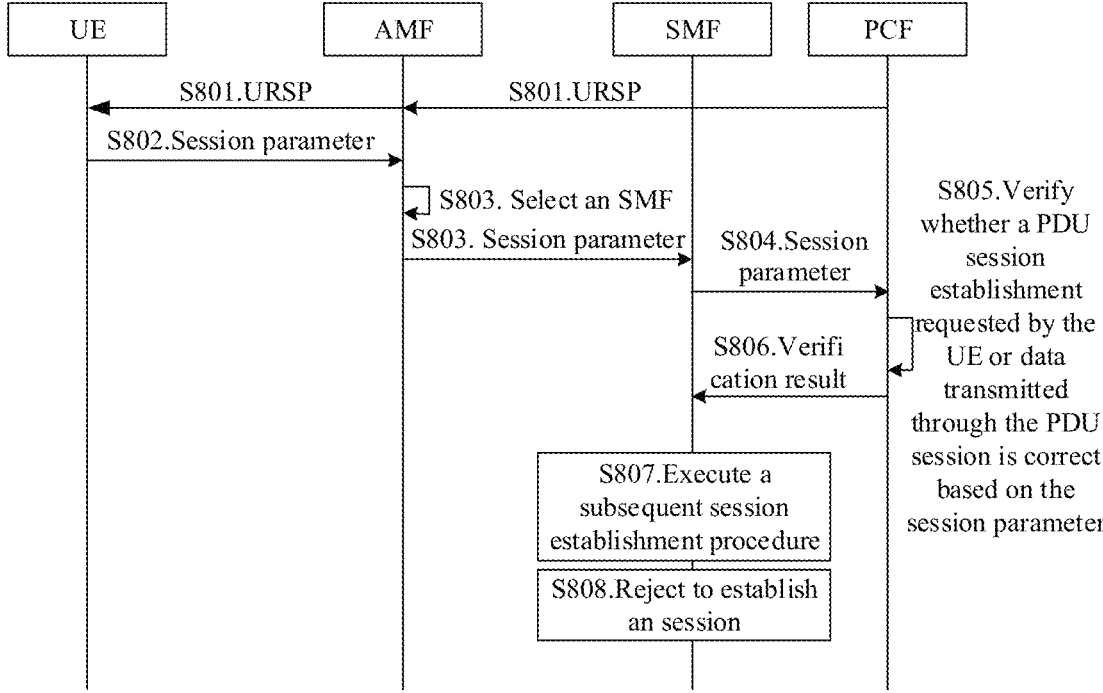
FIG. 10 is another optional processing flowchart of a session verification method applied to a communication system according to an embodiment of the present disclosure.

Based on the above descriptions about the respective session verification method applied to each network element, another optional processing flow of a session verification method applied to a communication system in an embodiment of the present disclosure includes the following operations, as illustrated in FIG. 10.

In S801, UE acquires a URSP from a PCF entity.

In some embodiments, a processing process of S801 is the same as that of S601, and will not be elaborated herein.

In S802, the UE sends a session parameter to an AMF entity.

In some embodiments, a processing process of S802 is the same as that of S602, and will not be elaborated herein.

In S803, the AMF entity selects an SMF entity and sends the session parameter to the selected SMF entity.

In some embodiments, a processing process that the AMF entity selects an SMF entity is the same as S302', and will not be elaborated herein.

A processing process that the AMF entity sends the session parameter to the selected SMF entity is the same as that of S303', and will not be elaborated herein.

In S804, the SMF entity sends the session parameter to the PCF entity.

The SMF entity sends the session parameter to an H-PCF entity in a non-roaming scenario. The SMF entity sends the session parameter to a V-PCF entity in a roaming scenario.

In S805, the PCF entity verifies whether a PDU session establishment requested by the UE or data transmitted through the PDU session is correct based on the session parameter.

In some embodiments, the PCF entity determines an RSD according to the session parameter. The PCF entity determines that the PDU session establishment requested by the UE or the data transmitted through the PDU session is correct when a parameter other than an RSD ID in the session parameter is consistent with that in the RSD.

In some other embodiments, the PCF entity determines an RSD according to the session parameter. The PCF entity determines that the PDU session establishment requested by the UE or the data transmitted through the PDU session is incorrect when a parameter other than an RSD ID in the session parameter is inconsistent with that in the RSD.

It is to be noted that the PCF entity queries the URSP according to the RSD ID and/or traffic descriptor in the session parameter and searches the URSP for a URSP rule corresponding to the RSD ID and/or the traffic descriptor and an RSD in the URSP rule. Both a V-PCF entity and an H-PCF entity may determine whether the PDU session establishment requested by the UE or the data transmitted through the PDU session is correct. However, in some specific scenarios, if the V-PCF entity may not find the RSD in the URSP rule corresponding to the RSD ID and/or the traffic descriptor, the V-PCF entity sends the session parameter to the H-PCF entity, and the H-PCF entity searches for the RSD in the URSP rule corresponding to the RSD ID and/or the traffic descriptor to determine whether the PDU session establishment requested by the UE or the data transmitted through the PDU session is correct.

In S806, the PCF entity sends a verification result to the SMF entity.

In S807, the SMF entity executes a subsequent session establishment procedure in response to determining that the PDU session establishment requested by the UE or the data transmitted through the session is correct.

The SMF entity sends a traffic descriptor to a UPF entity. The traffic descriptor is used for the UPF entity to determine whether the data is transmitted through a correct session. After data transmission is started, the UPF entity checks whether uplink data is consistent with the traffic descriptor or the another parameter capable of characterizing data according to the traffic descriptor or the other parameter capable of characterizing data, so as to determine whether the data is transmitted through a correct session. If incorrect data is found, the incorrect data is abandoned, and the SMF entity is notified to release the session.

In S808, the SMF entity rejects a session establishment request with a cause value contained in response to determining that the PDU session establishment requested by the UE or the data transmitted through the PDU session is incorrect. The cause value may be a URSP verification failure, etc.

An MM module in a NAS layer of the UE receives and forwards the cause value to an SM module. The SM module stops a timer started when the session is established. The flow may be restarted from S801.

It is to be understood that, in each embodiment of the present disclosure, a magnitude of a sequence number of each process does not mean an execution order and the execution order of each process should be determined by its function and an internal logic and should not form any limit to an implementation process of the embodiments of the present disclosure.

Figure 11:
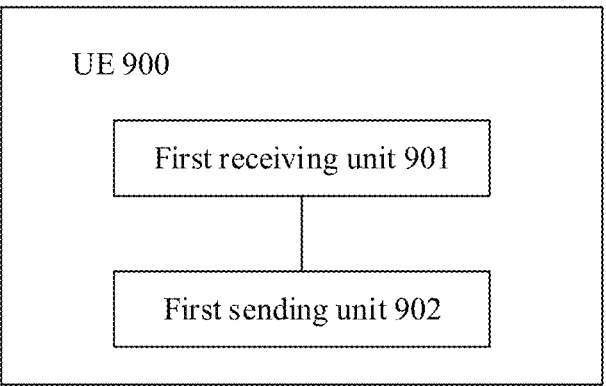
FIG. 11 is a composition structure diagram of UE according to an embodiment of the present disclosure.

In order to implement the session verification method, an embodiment of the present disclosure provides UE. As illustrated in FIG. 11, a composition structure of the UE 900 includes a first receiving unit 901 and a first sending unit 902.

The first receiving unit 901 is configured to receive a URSP sent by a PCF entity, the URSP including an RSD ID or a URSP rule ID.

The first sending unit 902 is configured to send a session parameter to a first network element. The session parameter is used for verifying whether a PDU session establishment requested by the UE or data transmitted through the PDU session is correct.

In some embodiments, the RSD ID is allocated by an H-PCF entity when the UE is in an HPLMN.

In some embodiments, when the UE is in a VPLMN, an RSD ID in a URSP for an HPLMN is allocated by an H-PCF entity, and/or, an RSD ID in a URSP for the VPLMN is allocated by a V-PCF entity.

In some embodiments, when the UE is in a VPLMN, both an RSD ID in a URSP for an HPLMN and an RSD ID in a URSP for the VPLMN are allocated by an H-PCF entity.

In some embodiments, the RSD ID includes no PLMN ID, and RSD IDs are numbered according to a sequence of the RSD IDs in the URSP.

In some embodiments, the RSD ID includes a PLMN ID, the RSD ID includes a serial number of the RSD ID in a PLMN in the URSP, and/or the RSD ID includes a serial number of the RSD ID in a URSP rule.

In some embodiments, the first sending unit 902 is configured to send a NAS message to the first network element. The NAS message includes a session establishment request or a session modification request.

In some embodiments, the session parameter is contained in the session establishment request or the session modification request. Alternatively, the session parameter is contained in the NAS message but not in the session establishment request or the session modification request. Alternatively, the session parameter is contained in both the NAS message and the session establishment request or the session modification request.

In some embodiments, the session parameter at least includes at least one of the RSD ID or a traffic descriptor, or, at least one of the URSP rule ID or the traffic descriptor.

In some embodiments, the RSD ID is unique in the UE.

Figure 12:
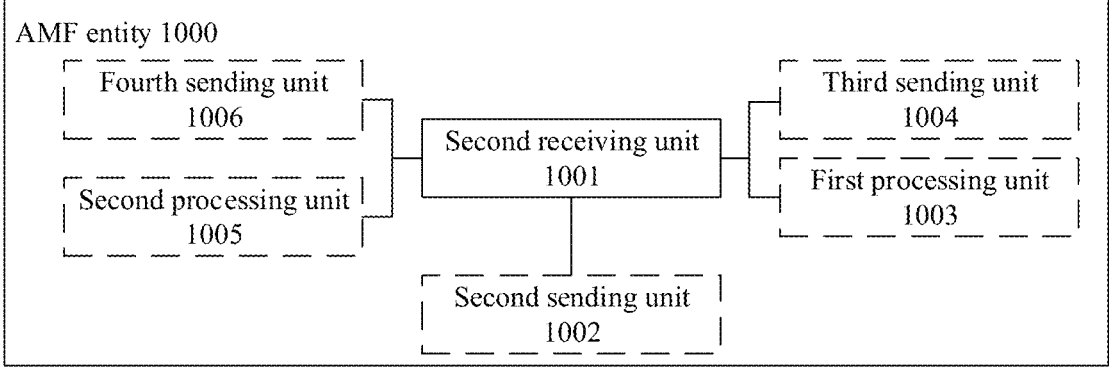
FIG. 12 is a composition structure diagram of an AMF entity according to an embodiment of the present disclosure.

In order to implement the session verification method, an embodiment of the present disclosure provides an AMF entity. As illustrated in FIG. 12, a composition structure of the AMF entity 1000 includes a second receiving unit 1001.

The second receiving unit 1001 is configured to receive a session parameter sent by UE.

The session parameter at least includes at least one of an RSD ID or a traffic descriptor, or at least one of a URSP rule ID or the traffic descriptor.

In some embodiments, the AMF entity 1000 further includes a second sending unit 1002.

The second sending unit 1002 is configured to send the session parameter to a PCF entity. The session parameter is used for the PCF entity to verify whether a PDU session establishment requested by UE or data transmitted through the PDU session is correct.

In some embodiments, the PCF entity is an H-PCF entity when the UE is in an HPLMN. Alternatively, the PCF entity is a V-PCF entity or an H-PCF entity when the UE is in a VPLMN.

In some embodiments, the AMF entity 1000 further includes a first processing unit 1003.

The first processing unit 1003 is configured to select an SMF entity for session establishment when the second receiving unit receives, from the PCF entity, a verification result indicating that the PDU session establishment requested by the UE or the data transmitted through the session is correct.

In some embodiments, the AMF entity 1000 further includes a third sending unit 1004.

The third sending unit 1004 is configured to send a verification failure message to the UE when the second receiving unit receives, from the PCF entity, a verification result indicating that the PDU session establishment requested by the UE or the data transmitted through the PDU session is incorrect, the verification failure message containing a failure cause value.

In some embodiments, the AMF entity 1000 further includes a second processing unit 1005.

The second processing unit 1005 is configured to select an SMF entity configured to verify whether a PDU session establishment requested by the UE or data transmitted through the PDU session is correct.

In some embodiments, the AMF entity 1000 further includes a fourth sending unit 1006.

The fourth sending unit 1006 is configured to send the session parameter to the SMF entity such that the SMF entity sends the session parameter to a PCF entity to verify whether the PDU session establishment requested by the UE or the data transmitted through the PDU session is correct.

In some embodiments, the RSD ID is allocated by an H-PCF entity when the UE is in an HPLMN.

In some embodiments, when the UE is in a VPLMN, an RSD ID in a URSP for an HPLMN is allocated by an H-PCF entity, and/or, an RSD ID in a URSP for the VPLMN is allocated by a V-PCF entity.

In some embodiments, when the UE is in a VPLMN, both an RSD ID in a URSP for an HPLMN and an RSD ID in a URSP for the VPLMN are allocated by an H-PCF entity.

In some embodiments, the RSD ID includes no PLMN ID, and the RSD IDs are numbered according to a sequence of the RSD IDs in the URSP.

In some embodiments, the RSD ID includes a PLMN ID, the RSD ID includes a serial number of the RSD ID in a PLMN in the URSP, and/or the RSD ID includes a serial number of the RSD ID in a URSP rule.

In some embodiments, the second receiving unit 1001 is configured to receive a NAS message sent by the UE, the NAS message including a session establishment request or a session modification request.

In some embodiments, the session parameter is contained in the session establishment request or the session modification request. Alternatively, the session parameter is contained in the NAS message but not in the session establishment request or session modification request received by the AMF entity from the UE.

In some embodiments, the RSD ID is unique in the UE.

Figure 13:
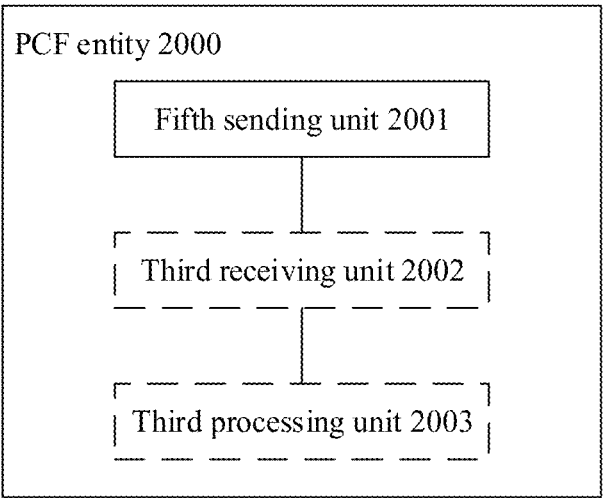
FIG. 13 is a composition structure diagram of a PCF entity according to an embodiment of the present disclosure.

In order to implement the session verification method, an embodiment of the present disclosure provides a PCF entity. As illustrated in FIG. 13, a composition structure of the PCF entity 2000 includes a fifth sending unit 2001.

The fifth sending unit 2001 is configured to send a URSP to UE, the URSP including an RSD ID or a URSP rule ID.

In some embodiments, the PCF entity further includes a third receiving unit 2002, configured to receive a session parameter. The session parameter at least includes at least one of the RSD ID or a traffic descriptor, or at least one of the URSP rule ID or the traffic descriptor.

In some embodiments, the session parameter is sent by an AMF entity. Alternatively, the session parameter is sent by an SMF entity.

In some embodiments, the PCF entity further includes a third processing unit 2003, configured to determine an RSD according to the session parameter.

In some embodiments, the third processing unit 2003 is configured to: determine that a PDU session establishment requested by the UE or data transmitted through the PDU session is correct when a parameter other than the RSD ID in the session parameter is consistent with that in the RSD; or, determine that a PDU session establishment requested by the UE or data transmitted through the PDU session is incorrect when a parameter other than the RSD ID in the session parameter is inconsistent with that in the RSD.

In some embodiments, the RSD ID is allocated by an H-PCF entity when the UE is in an HPLMN.

In some embodiments, when the UE is in a VPLMN, an RSD ID in a URSP for an HPLMN is allocated by an H-PCF entity, and/or, an RSD ID in a URSP for the VPLMN is allocated by a V-PCF entity.

In some embodiments, when the UE is in a VPLMN, both an RSD ID in a URSP for an HPLMN and an RSD ID in a URSP for the VPLMN are allocated by an H-PCF entity.

In some embodiments, the RSD ID includes no PLMN ID, and RSD IDs are numbered according to a sequence of the RSD IDs in the URSP.

In some embodiments, the RSD ID includes a PLMN ID, the RSD ID includes a serial number of the RSD ID in a PLMN in the URSP, and/or the RSD ID includes a serial number of the RSD ID in a URSP rule.

In some embodiments, the second receiving unit 1001 is configured to receive a NAS message sent by the UE, the NAS message including a session establishment request or a session modification request.

In some embodiments, the session parameter is contained in the session establishment request or the session modification request. Alternatively, the session parameter is contained in the NAS message but not in the session establishment request or session modification request received by the AMF entity from the UE.

In some embodiments, the RSD ID is unique in the UE.

Figure 14:
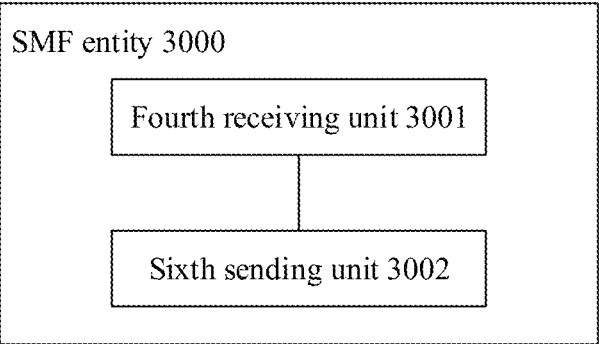
FIG. 14 is a composition structure diagram of an SMF entity according to an embodiment of the present disclosure.

In order to implement the session verification method, an embodiment of the present disclosure provides an SMF entity. As illustrated in FIG. 14, a composition structure of the SMF entity 3000 includes a fourth receiving unit 3001 and a sixth sending unit 3002.

The fourth receiving unit 3001 is configured to receive a session parameter sent by an AMF entity.

The session parameter at least includes at least one of an RSD ID or a traffic descriptor, or at least one of a URSP rule ID or the traffic descriptor.

The sixth sending unit 3002 is configured to send the session parameter to a PCF entity, the session parameter being used for the PCF entity to verify whether a PDU session establishment requested by UE or data transmitted through the PDU session is correct.

In some embodiments, the RSD ID is allocated by an H-PCF entity when the UE is in an HPLMN.

In some embodiments, when the UE is in a VPLMN, an RSD ID in a URSP for an HPLMN is allocated by an H-PCF entity, and/or, an RSD ID in a URSP for the VPLMN is allocated by a V-PCF entity.

In some embodiments, when the UE is in a VPLMN, both an RSD ID in a URSP for an HPLMN and an RSD ID in a URSP for the VPLMN are allocated by an H-PCF entity.

In some embodiments, the RSD ID includes no PLMN ID, and RSD IDs are numbered according to a sequence of the RSD IDs in the URSP.

In some embodiments, the RSD ID includes a PLMN ID, the RSD ID includes a serial number of the RSD ID in a PLMN in the URSP, and/or the RSD ID includes a serial number of the RSD ID in a URSP rule.

In some embodiments, the sixth sending unit 3002 is further configured to send the traffic descriptor to a UPF entity when the PDU session establishment requested by the UE or the data transmitted through the PDU session is correct, the traffic descriptor being used for the UPF entity to determine whether data is transmitted through a correct session, or, by the SMF entity, reject an session establishment request or does not use the session to transmit data (i.e., skip data transmission through the session) when the PDU session establishment requested by the UE or the data transmitted through the PDU session is incorrect.

In some embodiments, the fourth receiving unit 3001 is further configured to receive a notification message sent by the UPF entity and release the session when the data is not transmitted through the correct session.

An embodiment of the present disclosure also provides UE, which includes a processor and a memory configured to store a computer program executable by the processor. The processor is configured to run the computer program to execute the steps of the session verification method executed by UE.

An embodiment of the present disclosure also provides an AMF entity, which includes a processor and a memory configured to store a computer program executable by the processor. The processor is configured to run the computer program to execute the steps of the session verification method executed by an AMF entity.

An embodiment of the present disclosure also provides a PCF entity, which includes a processor and a memory configured to store a computer program executable by the processor. The processor is configured to run the computer program to execute the steps of the session verification method executed by a PCF entity.

An embodiment of the present disclosure also provides an SMF entity, which includes a processor and a memory configured to store a computer program executable by the processor. The processor is configured to run the computer program to execute the steps of the session verification method executed by an SMF entity.

Figure 15:
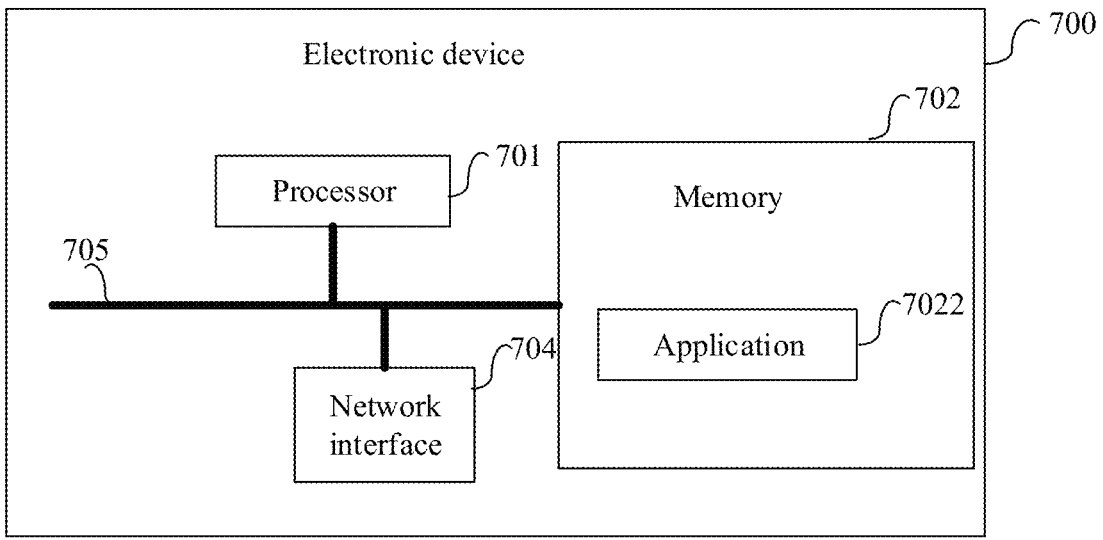
FIG. 15 is a hardware composition structure diagram of an electronic device according to an embodiment of the present disclosure.

FIG. 15 is a hardware composition structure diagram of an electronic device (UE, an AMF entity, a PCF entity, or an SMF entity) according to an embodiment of the present disclosure. The electronic device 700 includes at least one processor 701, a memory 702, and at least one network interface 704. Components in the electronic device 700 are coupled together through a bus system 705. It can be understood that the bus system 705 is configured to implement connection communication between these components. The bus system 705 includes a data bus, and further includes a power bus, a control bus, and a state signal bus. However, for the clarity of description, various buses in FIG. 15 are marked as the bus system 705.

It can be understood that the memory 702 may be a volatile memory or a non-volatile memory, or may include both of the volatile and non-volatile memories. The non-volatile memory may be a Read-Only Memory (ROM), a Programmable ROM (PROM), an Erasable PROM (EPROM), an Electrically EPROM (EEPROM), a Ferromagnetic Random Access Memory (FRAM), a flash memory, a magnetic surface memory, a compact disc or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRS-DRAM), an Enhanced Synchronous Dynamic Random Access Memory (ESDRAM), a SyncLink Dynamic Random Access Memory (SLDRAM) and a Direct Rambus Random Access Memory (DRRAM). The memory 702 described in the embodiment of the present disclosure is intended to include, but is not limited to, memories of these and any other proper types.

In the embodiment of the present disclosure, the memory 702 is configured to store various types of data to support the operation of the electronic device 700. Examples of the data include any computer program, for example, an application 7022, operated in the electronic device 700. A program implementing the method of the embodiments of the present disclosure may be included in the application 7022.

The method disclosed in the embodiments of the present disclosure may be applied to the processor 701 or implemented by the processor 701. The processor 701 may be an integrated circuit chip with a signal processing capability. In an implementation process, each step of the method may be completed by an integrated logic circuit of hardware in the processor 701 or one or more instructions in a software form. The processor 701 may be a universal processor, a Digital Signal Processor (DSP) or another Programmable Logic Device (PLD), a discrete gate or transistor logic device, a discrete hardware component, etc. The processor 701 may perform or execute each method, step and logical block diagram disclosed in the embodiments of the present disclosure. The universal processor may be a microprocessor, any conventional processor or the like. The steps of the method disclosed in combination with the embodiments of the present disclosure may be directly embodied to be executed and completed by a hardware decoding processor or executed and completed by a combination of hardware and software modules in the decoding processor. The software module may be in a storage medium. The storage medium is in the memory 702. The processor 701 reads information in the memory 702 and completes the steps of the method in combination with hardware.

In an exemplary embodiment, the electronic device 700 may be implemented by one or more Application Specific Integrated Circuits (ASICs), DSPs, PLDs, Complex Programmable Logic Devices (CPLDs), Field Programmable Gate Arrays (FPGAs), universal processors, controllers, Micro Controller Units (MCUs), Microprocessor Units (MPUs), or other electronic components, and is configured to execute the above-mentioned method.

An embodiment of the present disclosure also provides a storage medium, which is configured to store a computer program.

Optionally, the storage medium may be applied to the UE in the embodiments of the present disclosure. The computer program enables a computer to execute corresponding flows in each method of the embodiments of the present disclosure. For simplicity, elaborations are omitted herein.

The present disclosure is described with reference to flowcharts and/or block diagrams of the method, device (system), and computer program product according to the embodiments of the present disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

The above is only the preferred embodiment of the present disclosure and not intended to limit the scope of protection of the present disclosure. Any modifications, equivalent replacements, improvements and the like made within the spirit and principle of the present disclosure shall fall within the scope of protection of the present disclosure.

The invention claimed is:

1. A method for session verification, comprising:
    receiving, by a User Equipment (UE), a UE Route Selection Policy (URSP) from a Policy Control Function (PCF) entity, wherein the URSP comprises a Route Selection Descriptor (RSD) Identifier (ID) or a URSP rule ID; and
    sending, by the UE, a session parameter to a first network element, wherein the first network element is a Session Management Function (SMF) entity, and the session parameter is used for the SMF entity to verify whether a Protocol Data Unit (PDU) session establishment requested by the UE is correct,
    wherein the session parameter comprises a traffic descriptor,
    wherein sending, by the UE, the session parameter to the first network element comprises:
    sending, by the UE, a Non-Access Stratum (NAS) message to the first network element, wherein the NAS message comprises a session establishment request or a session modification request,
    wherein one of the following applies:
    the session parameter is carried in the session establishment request or the session modification request; or the session parameter is carried in both the NAS message and one of the session establishment request or the session modification request.

2. The method of claim 1, wherein the RSD ID is allocated by a Home Policy Control Function (H-PCF) entity when the UE is in a Home Public Land Mobile Network (HPLMN).

3. The method of claim 1, wherein when the UE is in a Visited Public Land Mobile Network (VPLMN), an RSD ID in a URSP for an HPLMN is allocated by an H-PCF entity, and an RSD ID in a URSP for the VPLMN is allocated by a Visited Policy Control Function (V-PCF) entity or the H-PCF entity.

4. The method of claim 1, wherein the RSD ID comprises no Public Land Mobile Network (PLMN) ID; and
    wherein RSD IDs are numbered according to a sequence of the RSD IDs in the URSP.

5. The method of claim 1, wherein the RSD ID comprises a PLMN ID; and
    wherein the RSD ID comprises a serial number of the RSD ID in a PLMN in the URSP; or, the RSD ID comprises a serial number of the RSD ID in a URSP rule.

6. The method of claim 1, wherein the SMF entity sends the session parameter to the PCF entity, the PCF entity determines an RSD according to the session parameter, the PCF entity determines that the PDU session establishment requested by the UE is correct when a parameter other than the RSD ID in the session parameter is consistent with a parameter in the RSD, and the PCF entity determines that the PDU session establishment requested by the UE is incorrect when a parameter other than an RSD ID in the session parameter is inconsistent with a parameter in the RSD.

7. The method of claim 1, wherein the SMF entity executes a subsequent session establishment procedure in response to determining that the PDU session establishment requested by the UE is correct, and the SMF entity rejects a session establishment request with a cause value contained in response to determining that the PDU session establishment requested by the UE is incorrect.

8. A method for session verification, comprising:
    receiving, by a Session Management Function (SMF) entity, a session parameter from a User Equipment (UE),
    wherein the session parameter comprises a traffic descriptor, and
    wherein the session parameter is used for the SMF to verify whether a Protocol Data Unit (PDU) session establishment requested by the UE is correct,
    wherein receiving, by the SMF entity, the session parameter from the UE comprises:
    receiving, by the SMF entity, a Non-Access Stratum (NAS) message from the UE, wherein the NAS message comprises a session establishment request or a session modification request,
    wherein one of the following applies:
    the session parameter is carried in the session establishment request or the session modification request; or
    the session parameter is carried in both the NAS message and one of the session establishment request or the session modification request.

9. The method of claim 8, wherein when the UE is in a Visited Public Land Mobile Network (VPLMN), an Route Selection Descriptor (RSD) Identifier (ID) in a UE Route Selection Policy (URSP) for an Home Public Land Mobile Network (HPLMN) is allocated by an Home Policy Control Function (H-PCF) entity, and an RSD ID in a URSP for the VPLMN is allocated by a Visited Policy Control Function (V-PCF) entity or the H-PCF entity.

10. The method of claim 8, wherein the SMF entity sends the session parameter to Policy Control Function (PCF) entity, the PCF entity determines an Route Selection Descriptor (RSD) according to the session parameter, the PCF entity determines that the PDU session establishment requested by the UE is correct when a parameter other than a RSD Identifier (ID) in the session parameter is consistent with a parameter in the RSD, and the PCF entity determines that the PDU session establishment requested by the UE is incorrect when a parameter other than an RSD ID in the session parameter is inconsistent with a parameter in the RSD.

11. The method of claim 8, wherein the SMF entity executes a subsequent session establishment procedure in response to determining that the PDU session establishment requested by the UE is correct, and the SMF entity rejects a session establishment request with a cause value contained in response to determining that the PDU session establishment requested by the UE is incorrect.

12. User Equipment (UE), comprising:
a processor, configured to:
receive, through a network interface, a UE Route Selection Policy (URSP) from a Policy Control Function (PCF) entity, wherein the URSP comprises a Route Selection Descriptor (RSD) Identifier (ID) or a URSP rule ID; and
send, through the network interface, a session parameter to a first network element, wherein the first network element is a Session Management Function (SMF) entity, and the session parameter is used for the SMF entity to verify whether a Protocol Data Unit (PDU) session establishment requested by the UE is correct,
wherein the session parameter comprises a traffic descriptor,
wherein the processor is further configured to:
send a Non-Access Stratum (NAS) message to the first network element,
wherein the NAS message comprises a session establishment request or a session modification request,
wherein one of the following applies:
the session parameter is carried in the session establishment request or the session modification request; or
the session parameter is carried in both the NAS message and one of the session establishment request or the session modification request.

13. The UE of claim 12, wherein the SMF entity sends the session parameter to the PCF entity, the PCF entity determines an RSD according to the session parameter, the PCF entity determines that the PDU session establishment requested by the UE is correct when a parameter other than the RSD ID in the session parameter is consistent with a parameter in the RSD, and the PCF entity determines that the PDU session establishment requested by the UE is incorrect when a parameter other than an RSD ID in the session parameter is inconsistent with a parameter in the RSD.

14. The UE of claim 12, wherein the SMF entity executes a subsequent session establishment procedure in response to determining that the PDU session establishment requested by the UE is correct, and the SMF entity rejects a session establishment request with a cause value contained in response to determining that the PDU session establishment requested by the UE is incorrect.

15. A Session Management Function (SMF) entity, comprising:
a processor, configured to receive, through a network interface, a session parameter from a User Equipment (UE),
wherein the session parameter comprises a traffic descriptor, and
wherein the session parameter is used for the SMF to verify whether a Protocol Data Unit (PDU) session establishment requested by the UE is correct,
wherein the processor is configured to:
receive a Non-Access Stratum (NAS) message from the UE, wherein the NAS message comprises a session establishment request or a session modification request,
wherein one of the following applies:
the session parameter is carried in the session establishment request or the session modification request; or
the session parameter is carried in both the NAS message and one of the session establishment request or the session modification request.

16. The SMF entity of claim 15, wherein the SMF entity sends the session parameter to Policy Control Function (PCF) entity, the PCF entity determines an Route Selection Descriptor (RSD) according to the session parameter, the PCF entity determines that the PDU session establishment requested by the UE is correct when a parameter other than a RSD Identifier (ID) in the session parameter is consistent with a parameter in the RSD, and the PCF entity determines that the PDU session establishment requested by the UE is incorrect when a parameter other than an RSD ID in the session parameter is inconsistent with a parameter in the RSD.

\* \* \* \* \*